April 9, 1929. B. M. W. HANSON 1,708,570
METHOD OF AND APPARATUS FOR GRINDING WORM GEARS
Filed Dec. 24, 1924

Inventor
Bengt M. W. Hanson
by T. Clay Lindsey
His Attorney

Patented Apr. 9, 1929.

1,708,570

UNITED STATES PATENT OFFICE.

BENGT M. W. HANSON, OF HARTFORD, CONNECTICUT; EINAR A. HANSON EXECUTOR OF SAID BENGT M. W. HANSON, DECEASED.

METHOD OF AND APPARATUS FOR GRINDING WORM GEARS.

Application filed December 24, 1924. Serial No. 757,922.

The aim of the present invention is to provide an improved method of and apparatus for grinding worm gears having various features of novelty and advantage.

A more particular aim of the invention is to provide an improved machine and method by means of which worm gears and the like may be very efficiently and accurately ground.

Other objects will be in part obvious and in part pointed out more in detail hereinafter.

The invention accordingly consists in the features of construction, combination of elements and arrangement of parts which will be exemplified in the construction hereinafter set forth, and the scope of the application of which will be indicated in the appended claims.

In the accompanying drawing is shown one form of apparatus which may be employed for carrying out the invention, but it is to be understood that this showing is merely by way of illustration and it is not to be construed in any way as a limitation of the scope of the invention. Quite obviously, the machine may take various forms, and the method of grinding may be employed in machines of proper construction or design. The machine shown in the accompanying drawing is illustrated more or less diagrammatically.

Figure 1:
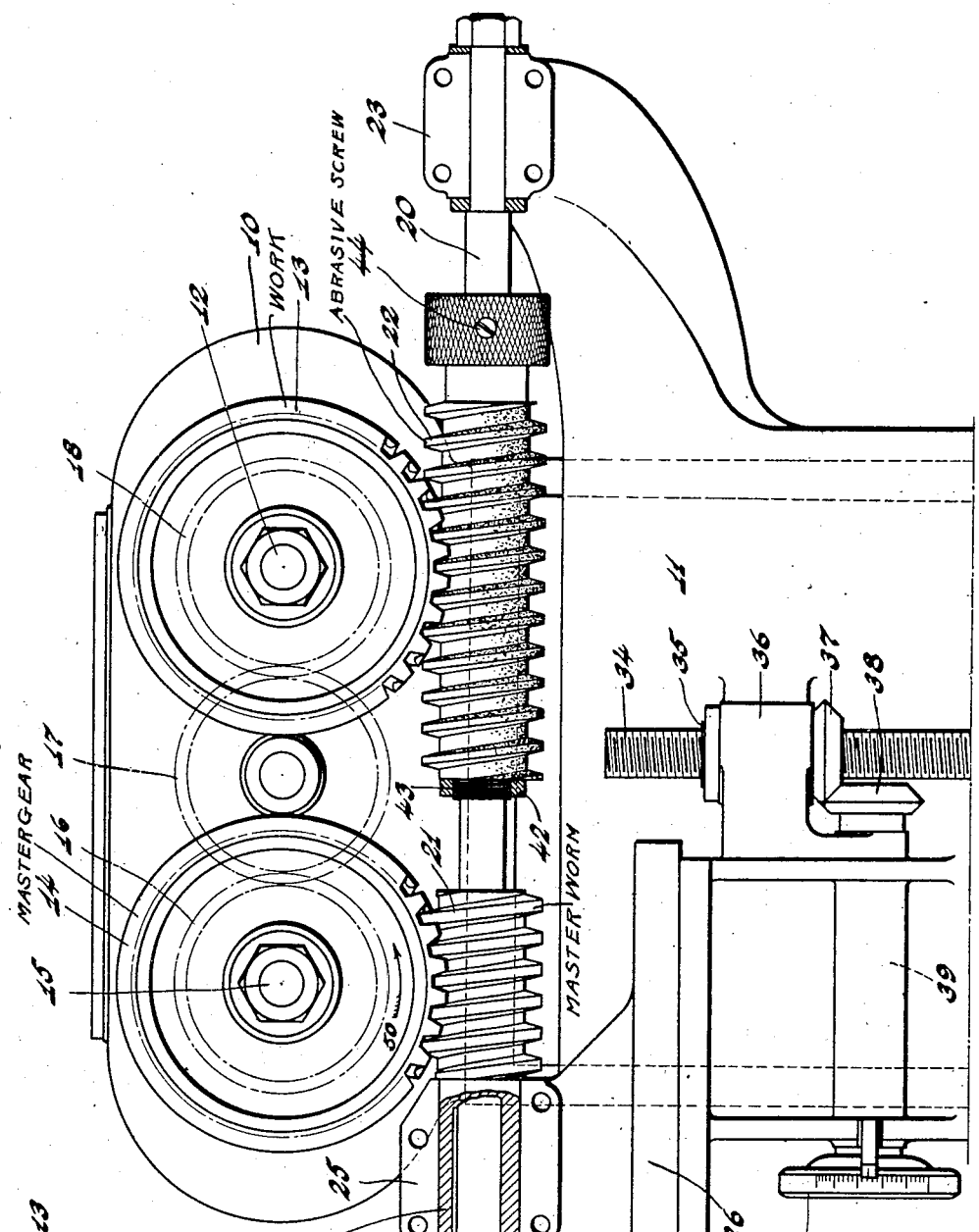
Figure 1 is a front view of the machine.

Referring to the drawing in detail, 10 is a standard, base or bed mounted on the forward face of which is a carriage or knee 11. 12 is a work support in the form of a shaft mounted in the upper end of the standard 10. The work, which is in the form of a worm gear, is designated by the numeral 13. 14 denotes a master worm gear corresponding, in all particulars, to the desired size and shape to be given to the work. This master gear is mounted on a shaft 15 in parallelism with the shaft 12. The shafts 12 and 15 are driven in unison in any suitable manner, as, for instance, by intermeshing gears 16, 17 and 18 of like size.

Rotatably mounted on the knee or carriage 11 is a shaft 20 to which is fixed, against rotation, a master worm 21 meshing with the master gear 14 and an abrasive grinding worm 22, the construction and arrangement of which will be hereinafter described more in detail. In the present instance, one end of the shaft 20 is journalled in a bearing 23. About the other end of the shaft, and keyed thereto, is a sleeve 24 rotatably mounted in a bearing 25 provided on a cross-slide 26. The caps, which comprise halves of the bearings 23 and 25, are shown removed. On the sleeve 24 is the master worm 21. Keyed to the outer end of the sleeve is a driving pulley 27 which may be held in place by a nut 28 screwed onto the sleeve 24. The slide 26 may be adjusted axially of the shaft 21 and the abrasive worm 22 carried thereby in any suitable manner, as, for instance, by means of a screw 30 having a handle or knob 31. For the purpose of indicating the adjustment of this slide, the knob may have a suitable scale 32 with which cooperates a pointer 33. The carriage or knee 11, together with the parts carried thereby, may be vertically adjusted in any suitable manner; for instance, there may be provided an upright screw 34 carrying a nut 35 journalled in, but fixed against axial movement relative to, a bearing 36 on the carriage. On the lower end of the nut 35 is a bevel gear 37 with which meshes a bevel gear 38 fixed on a shaft 39 provided at its outer end with a wheel or handle 40. It will be understood that, when the handle 40 is turned, the nut 35 will be rotated through the meshing bevel gears 37 and 38, causing the nut, together with the carriage, to ride up or down, as the case may be, on the screw 34.

Figure 2:
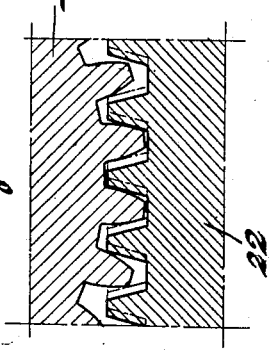
Fig. 2 is a diagrammatic view showing a portion of the work and the abrasive grinding worm in section.

The abrasive grinding worm 22 is in the form of a cylindrical member of carborundum or other suitable abrasive material having, on its periphery, a spiral rib, the pitch and diameter of which corresponds to the pitch and diameter of the master worm 21. This rib or worm has its side faces inclined similarly to the side faces of the master worm, but the rib is narrower than is the rib of the master worm. The abrasive worm 22 is of such length that it is provided with a greater number of convolutions than will be in engagement with the work at any time so that the abrasive worm may be adjusted axially at intervals so as to distribute the wear on the convolutions. It will be noted, particularly from Fig. 2, that the screw, in outline and in the grinding plane, will correspond to a rack adapted to mesh with the finished work, with the exception that the convolutions are narrower than the space between the adjacent teeth on the completed work. In the present instance, the abrasive worm is fixed by a nut 42 to a sleeve 43 surrounding the shaft 20 and fixed thereto in any suitable manner for angular and axial adjustment as, for example, by means of a set screw 44.

The operation of the machine is briefly as follows: The work 13, the teeth of which have been roughed out and then hardened, is fixed to the shaft 12 so that it has the proper relation with respect to the master worm gear 14. The power is then thrown onto the pulley 27, and the carriage 11 is raised by turning the bevel gears 38 so as to properly locate the abrasive worm radially of the work. The slide 26 will now be moved very slightly (by turning the screw 30), say to the right, and, since the master gear has a proper running contact with the master worm, and the work is controlled by the master gear, the result is that the teeth on the work are fed circumferentially against corresponding side faces of the active convolutions of the abrasive worm. More specifically, assuming that the master gear is rotated in the direction of the arrow 50, when the slide 26 is moved to the right, as just stated, the right hand faces of the teeth, which are in engagement with the abrasive worm, are ground, as shown more particularly by full lines in Fig. 2. After the right hand faces of the teeth are thus ground, the slide 26 will be moved to the left, thereby bringing the left hand faces of the teeth into engagement with the right hand faces of the convolutions of the abrasive worm, as shown by dotted lines in Fig. 2.

In order to distribute the wear upon the abrasive worm, and thus give it a longer life and avoid frequent retruing, the abrasive worm has a greater number of convolutions than are in engagement with the work at any time, and the abrasive worm is adjustable axially on the shaft 20. When it is desired to change the grinding surfaces, this may be done by loosening the set screw 44 and turning the abrasive worm the desired extent while the work is stationary and then fixing the worm to the shaft 20 by tightening up the set screw 44.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. The herein described method of grinding worm gears which consists in rotating, while in engagement, a worm gear and an abrasive grinding worm having a spiral rib of less width than the spaces between the teeth of the work, and while in grinding relation imparting a motion between said work and wheel to relatively feed the worm and work tangentially of the latter.

2. The herein described method of grinding worm gears and the like which consists in rotating the work comprising a worm gear and an abrasive grinding worm having a uniform spiral rib of less width than the spaces between the teeth of the work, effecting a locating movement of the work and grinding worm in a direction radially of the work, and effecting a slight feeding movement between the work and grinding worm in a direction substantially tangentially of the work.

3. The herein described method of grinding worm gears, which consists in rotating, while in engagement, a worm gear and an abrasive screw having a spiral rib of less width than the spaces between the teeth of the work, while in grinding relation imparting a motion between said work and wheel to relatively feed the worm and work tangentially of the latter, and adjusting said worm axially to vary the active grinding areas on the worm.

4. In a machine for grinding worm gears and in combination, a rotary work support, a grinding element comprising an abrasive worm the rib of which is of less width than the spiral of a worm adapted to properly mesh with the finished work, means for rotating said work support and grinding worm, and means for imparting a movement between the work support and grinding worm to effect a feeding movement between the work and grinding worm substantially tangentially of the work.

5. In a machine for grinding worm gears and the like, a rotary work support, a grinding element comprising an abrasive grinding worm the rib of which is of less width than the spiral of a worm adapted to mesh with the finished work, means for locating the grinding worm radially of the work, means for rotating the grinding worm and the said work support, and means for effecting a slight feeding movement between the work and the grinding worm in a direction substantially tangentially of the work.

6. In a machine for grinding worm gears and in combination, a rotary work support, a rotary grinding element comprising an abrasive worm having a rib uniform throughout its length and of less width than the spiral of a worm adapted to properly mesh with the finished work, means for rotating said work support and grinding worm, and means for effecting a slight feeding movement between the work and worm in a direction substantially tangentially of the work, said worm being longitudinally adjustable to change the effective grinding areas thereof and thereby distribute the wear.

7. In a machine for grinding worm gears and in combination, a master worm and an abrasive grinding worm rotated in unison, said grinding worm having a rib of less than normal width, a master worm gear meshing with said master worm, a rotary work support adapted to carry a piece of work on which said grinding worm is adapted to operate, a driving connection between said master worm gear and said work support, and means for moving one of said worms axially of the other to change the grinding relation between the work and said grinding worm.

8. In a machine for grinding worm gears, a rotary work support, a master worm gear through which said support is driven, a master worm meshing with said worm gear, an abrasive grinding worm having a rib of less than normal width adapted to operate upon the work carried by said work support, and means for longitudinally adjusting said master worm relative to said abrasive worm.

9. In a machine for grinding worm gears, a shaft, a master worm keyed to but adjustable longitudinally of said shaft, a master worm gear meshing with said master worm, an abrasive grinding worm carried by said shaft and having a rib of less than normal width, a work supporting shaft driven through said master gear and adapted to carry a piece of work upon which said grinding worm is adapted to operate, and means for longitudinally adjusting said master worm during the grinding operation, said grinding worm being adjustable longitudinally of said shaft whereby to permit the grinding areas to be changed and wear distributed.

BENGT M. W. HANSON.